Jan. 25, 1955  A. GODAT  2,700,273
SHOCK ABSORBING BEARING
Filed Oct. 7, 1953
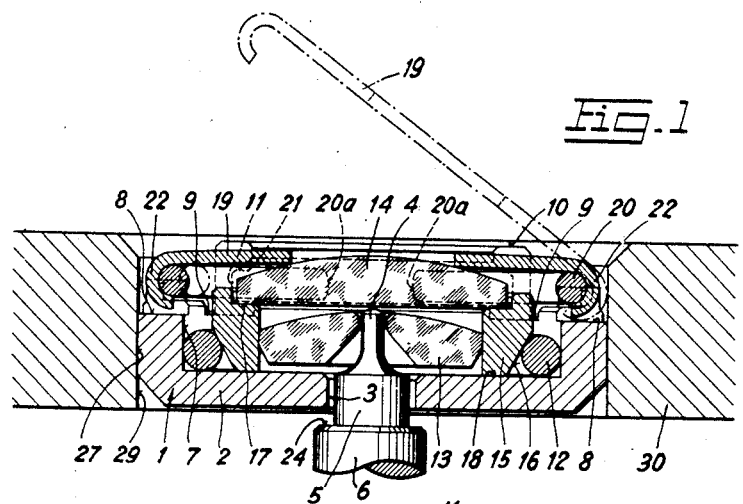
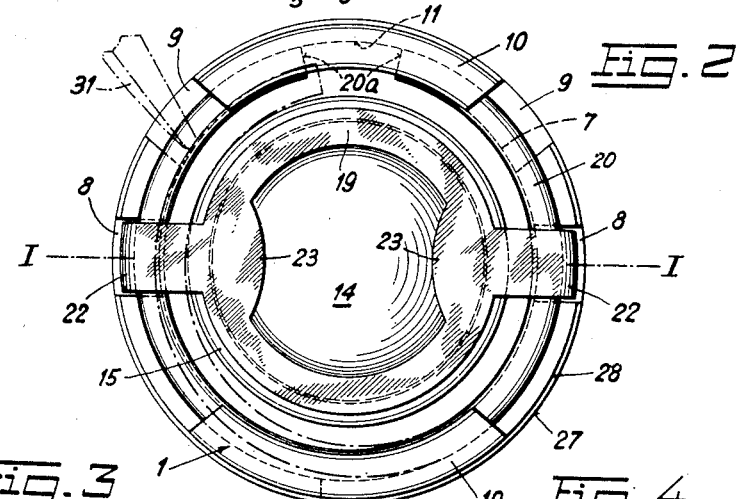
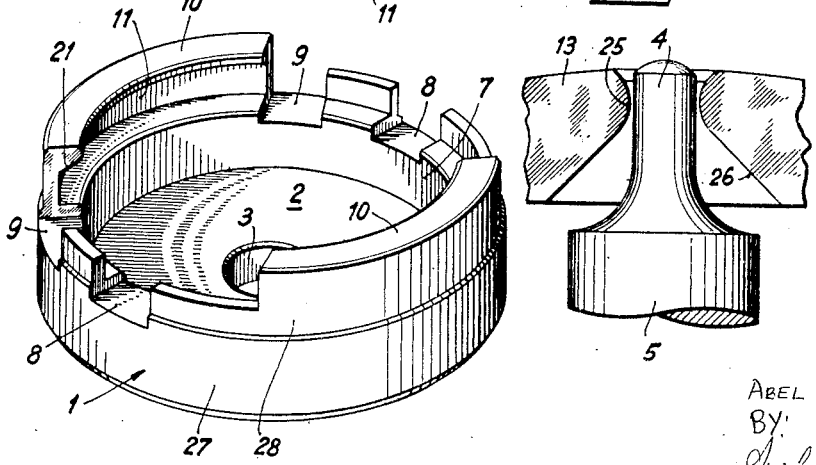
INVENTOR
ABEL GODAT
BY:

United States Patent Office

2,700,273
Patented Jan. 25, 1955

2,700,273

SHOCK ABSORBING BEARING

Abel Godat, Bienne, Switzerland, assignor to Bulova Watch Company Inc. New York, Succursale de Bienne, Bienne, Switzerland Application October 7, 1953, Serial No. 384,545

Claims priority, application Switzerland October 17, 1952

6 Claims. (Cl. 58—140)

This invention relates to shock absorbing bearings with a pierced and a cap jewel, in particular for the balance wheel pivots of a timepiece.

In the bearings known in the prior art, the cap jewel is yieldably held in place by a spring which has originally been fixed by means of a screw on to a part of the watch movement frame in which the bearing is fixed. Shock absorbing bearings have become, however, so independent a branch of watchmaking that their designers were obliged to standardize them in order to allow their mounting in every kind of timepiece. The bearing must thus constitute a unit which may be handled as a whole.

Springs for holding the cap jewel in place have therefore been provided on a housing carrying all elements of the bearing. The springs of this type, which are known in the art, are provided with two or more radial tongues adapted to be engaged under an appropriate shoulder of the housing.

Such springs often have the drawback that said radial tongues are short and, therefore, have not the desired elasticity. Another drawback of these springs is due to the fact that they risk to be easily lost, when the watchmaker tries to remove them for cleaning the bearing. These springs are, indeed, mounted with a relatively high pressure so that they easily jump away when they are removed.

There are even bearings known in the art which avoid this drawback by definitely fixing the spring to the cap jewel for instance, but these constructions are very complicated and besides their high costs, they cannot be manufactured in suitably small sizes in order to be used in ladies' watches.

It is therefore an object of the invention to provide a shock absorbing bearing forming a unit which may be set as a whole into a standard bore provided in a timepiece frame part of any type.

Another object of the invention is to provide a sufficiently resilient spring for yieldably holding the cap jewel in place satisfactorily.

Still another object of the invention is to provide a cover for the bearing, this cover and the cap jewel holding spring being arranged in such a way that no element of the bearing risks to get lost when opening the bearing in order to clean it.

Other objects and advantages of the invention will be apparent during the course of the following description in which some details have been disclosed although they have no significance for this invention. These details are, however, also described and claimed in another copending application.

One embodiment of the invention is represented in the accompanying drawings, forming a part of this application and in which like numerals are employed to designate like parts throughout the same.

In the drawings:

Fig. 1 is a diametrical section along line I—I of Fig. 2;

Fig. 2 is a plan view of the bearing;

Fig. 3 is a perspective view of one element of the bearing and

Fig. 4 shows a detail thereof on an enlarged scale.

The bearing represented comprises a housing 1 in which all its elements are supported and located. This housing, which is shown in detail in Fig. 3, has a circular bottom 2 in the center of which a circular bore 3 is provided, allowing the pivot 4 (Figs. 1 and 4) and the part 5 of a shaft 6, for instance the balance wheel shaft of a watch, to pass. With an intention disclosed hereinafter the diameter of bore 3 surpasses that of part 5 only by a small amount.

The housing 1 comprises further a cylindrical side wall 7 in which two diametrically opposite lodgings 8 are provided as well as two lateral openings 9. Two identical diametrically opposite projections 10 are still provided on side wall 7. The lodgings 8 are set off through an angle of 90° with respect to the projections 10. A groove 11 is provided in the inner wall of each projection 10.

Finally, on the lower section of the outer wall of housing 1 a cylindrical seat 27 is formed with a diameter somewhat larger than that of the upper part 28 of said outer wall. Seat 27 exactly positions the bearing within a cylindrical bore 29 (Fig. 1) provided in a part 30 of the watch movement frame, into which the bearing described is intended to be fixed.

A ring 12 having a circular section is located within housing 1 in such a position that it simultaneously bears against bottom 2 and side wall 7. This ring 12 is preferably made with bright stretched steel wire.

A pierced jewel 13 and a cap jewel 14 are mounted on a same setting 15 provided with a conical portion 16. Mounting both jewels in one and the same setting has the advantage of providing a well determined space between both jewels, thereby ensuring uniform lubrication of every bearing in mass production.

The bearings must indeed be lubricated prior to journalling a shaft in them. This lubrication, however, is not performed by filling with oil the whole space between both jewels, because oil having a greater affinity with metal than with the jewel material, would flow along the surfaces of setting 15 towards the walls of housing 1, thus entirely leaving the surfaces of the jewels. Oil must therefore be introduced into the bearing through the bore of the pierced jewel on to the cap jewel in so small an amount that will be just sufficient in order to form an oil drop between both jewels, which will remain by surface tension in the vicinity of the pierced jewel bore. If this drop is too large, the oil flows between the jewels and comes into contact with setting 15. On the contrary, if said drop is too small, it cannot possibly join both jewels and it flows on the surface of one of them. In both cases, the jewel surfaces provided for contacting the pivot would not be satisfactorily lubricated.

In order to ensure the desired precision in dispensing oil, it is indispensable to use improved tools which may be adjusted in such a way that they always dispense drops of a predetermined volume. Moreover, in order to only once adjust the oil distributor before going on oiling a series of bearings of the same size, the distance between both jewels in every bearing of the series must materially always be the same.

Once a pivot has been introduced into the bearing, as shown in Fig. 1, the oil drop collects itself between the pivot and the surfaces of the jewels contacting it. The distance the two jewels are set apart may thus vary, for instance by a displacement of the cap jewel with respect to the pierced jewel, and the oil is prevented by the pivot from leaving the surfaces it is intended to lubricate.

In order to allow an easy cleaning of this bearing, the pierced jewel 13 is introduced with force fit into setting 15, whereas the cap jewel 14 is merely located within a recess 17 provided in setting 15.

Fig. 4 shows in detail the shape of the central bore of jewel 13. This bore is constituted by a curved convex portion 25 and a conical portion 26 which fit together. Pivot 4 is normally located within portion 25 the smallest diameter of which is somewhat larger than the diameter of pivot 4, so that the latter has a small amount of shake in radial direction within the bore of jewel 13, thereby allowing shaft 6 to rotate freely. The function of the conical portion 26 will be described hereinafter.

The sizes of setting 15 are so designed that the lower surface portion 18 (Fig. 1) of setting 15 rests on the bottom 2 of housing 1 while the conical portion 16 contacts the ring 12 along its whole periphery.

The unit consisting of setting 15, pierced jewel 13 and cap jewel 14 is normally held in the position represented in Fig. 1 by a rigid cover member 19 mounted on a spring 20 in such a way that the cover member 19 urges said unit downwards.

Fig. 1 only shows the upper bearing of shaft 6, but it will be understood that the lower pivot of shaft 6 is journalled in a bearing identical with that which is represented. The distance between these two bearings is so adjusted (by shifting the whole bearing within bore 29, as may be necessary) that shaft 6 has a small amount of shake in axial direction. In the position represented in the drawings the shaft 6 is supposed to rest—for instance under the action of gravity—by its lower pivot on the cap jewel of the lower bearing, and the distance between the top end of pivot 4 and the cap jewel 14, in Fig. 1, corresponds to the amount of shake of shaft 6 in axial direction.

The annular circular spring 20 is opened at 20a and it is located within grooves 11 provided in projections 10 of the housing 1, so that the two extremities of spring 20 are located in the same groove as shown in Fig. 2. As clearly shown in Figs. 1 and 3, the grooves 11, which are easily formed by one milling operation, have a bevelled portion 21 in order to allow moving in an axial direction of spring 20 within these grooves 11, thereby avoiding to firmly clamp this spring in its portions located within said grooves. The circular ring-like cover member 19 is suspended to spring 20 by means of two diametrically opposite tongues 22 located within lodgings 8. These tongues are integral with the cover member and they are provided opposite boss portions 23 of this cover member. When the latter is set in place, as shown in Figs. 1 and 2, it is thus suspended to spring 20 at two points near the middle points of the two free portions of spring 20 between projections 10. The tongues 22 are bent through an angle somewhat inferior to 180° around spring 20, so that they may be removably fixed to said spring.

In order to set cover member 19 in place, the bent portion of one of the tongues 22—for instance the right one in Fig. 2—is firstly engaged around spring 20. The left end of spring 20 is then pushed inwardly towards the center of housing 1 and it is kept in this position (represented in dots and dashes in Figs. 1 and 2) by introducing the pointed end 31 of an appropriate tool (also represented in dots and dashes) through the left opening 9. The cover member 19 is then let down into closed position (shown in full lines in Fig. 1), thereby pivoting around spring 20 by means of its right tongue 22 which works like a hinge.

If the tool 31 is then withdrawn from the left opening 9 and the spring 20 released, this spring returns into its original position shown in full lines and it engages the bent portion of the left tongue 22 of cover member 19, thereby holding the latter in closed position. The sizes of the several elements of this bearing are so designed that the cover member 19 bears with a light pressure, by means of its boss portions 23, on the cap jewel 13, when said cover is in closed position.

The bearing described is intended to be set as a whole with force fit into a bore 29 (Fig. 1) provided in a part 30 (cock, bridge or base-plate) of a watch movement frame, so that the bearing will be almost entirely located within said bore.

If this bearing must be opened in order to remove therefrom the unit consisting of setting 15 and both jewels 13 and 14, the pointed end 31 of an appropriate tool is introduced into either one of the openings 9 of housing 1 and the corresponding portion of spring 20 is pushed inwards until the tongue 22 gripping this spring portion will be released. As soon as for instance the left spring portion has arrived into the position represented in dots and dashes in Figs. 1 and 2, the left tongue 22 is free and the cover member 19 quickly jumps up, because in closed position it is held with a certain pressure as previously disclosed. Instead of jumping away, this cover, however, pivots around spring 20 by means of its right tongue 22, which works as a hinge, until it comes for instance into the position shown in dots and dashes in Fig. 1. As this figure shows, the hinged tongue 22 is prevented from leaving the spring 20 by the side wall of bore 29 into which the bearing has been entirely set, this wall holding the bent portion of tongue 22 around spring 20.

Should the cover 19 be entirely removed from the spring 20, the two arms of spring 20 would only require to be entirely pushed inwards as previously described by successively introducing the pointed end 31 into the two openings 9.

The function of this bearing follows from its description.

When the bearing has once been set in place into the position shown in Fig. 1, and if shaft 6 is then thrust under the action of an axial shock for instance, the unit which consists of the setting and the jewels, as well as the cover 19, move back against the action of the spring 20 until the shoulder 24 of shaft 6 butts against the bottom 2 of housing 1. After the shock the spring 20 urges said unit back into the position shown in Fig. 1.

If we suppose, for instance, that the shock shifts the shaft 6 downwards, it is the cap jewel of the lower bearing that will move back. It will be observed that the displacements of the shaft could be so extensive, as to remove pivot 4, shown in Figs. 1 and 4, from the curved portion 25 of the pierced jewel central bore, this pivot thus bearing against the conical wall of part 26 of this bore. Conical part 26 is designed in such a way that pivot 4 smoothly slides along the conical wall of said part, and returns into the position shown in Fig. 4, as soon as the shaft 6 is subjected to the only action of the spring of the lower bearing, which corresponds to spring 20.

If the shaft 6 is subjected to a radial shock, the unit of the setting and the jewels moves radially and upwardly, thereby sliding over ring 12 by means of its conical portion 16 until part 5 of shaft 6 butts against the wall of bore 3 provided in the bottom 2.

During this displacement, the said unit is inclined with respect to the bottom 2 of housing 1, because the spring 20 always keeps the outer edge of the surface portion 18 of setting 15 in contact with the bottom 2 in one point. However, it will be observed that the pierced jewel never injures the pivot 4, even if this jewel is inclined with respect to the bottom 2, because of both the particular shape of the curved part 25 of its central bore, and the amount of shake of the pivot in radial direction.

After the shock, the spring 20 also urges the said unit back into the position shown in Fig. 1.

The pierced jewel centering means described and consisting of ring 12 and the conical portion 16 of setting 15, could, of course, be replaced by any other means already known in the art for this purpose.

It is to be understood that the form of my invention, herewith shown and described, is to be taken as a preferred example of the same, and that various changes in the shape, size and arrangement of parts may be resorted to, without departing from the spirit of my invention, or the scope of the subjoined claims.

I claim:

1. In a shock absorbing bearing, the combination of a pierced jewel, a cap jewel, a support having two resilient portions extending on two diametrically opposite sides of said jewels, and a rigid cover member provided with two independent means adapted each for removably securing said member to one of said resilient portions, said cover member being adapted for holding said cap jewel in place.

2. In a shock absorbing bearing, the combination of a housing, a pierced jewel and a cap jewel located both within said housing, a support carried by said housing and having two resilient portions extending on two diametrically opposite sides of the housing, and a cover member provided with two independent means adapted each for removably securing said member to one of said resilient portions, said cover member being adapted for holding said cap jewel in place.

3. In a shock absorbing bearing, the combination of a housing having a circular bottom portion, a cylindrical side wall and two diametrically opposite projections on said wall, two grooves being provided each in one of said projections; a pierced jewel and a cap jewel located both within said housing; an annular spring having a circular section and being opened at one point of its periphery, said spring being located within said grooves in such a position that its free ends are located within one of said grooves, and a circular cover member provided in two diametrically opposite points with means adapted for removably securing said member to said spring in the middle of the free portions extending between said projections, said cover member being adapted for holding said cap jewel in place.

4. The combination of claim 3, in which said securing means are constituted each by a tongue integral with the cover member and provided with a bent portion adapted for gripping said spring.

5. The combination of claim 4, in which the cover member is a ring provided at its inner side with two boss portions opposite said tongues, said boss portions being adapted for contacting each said cap jewel and holding it in place.

6. The combination of claim 4, in which two openings are provided in the side wall of the housing opposite said spring in order to allow an appropriate tool to be introduced into said housing for pushing said spring inwards.

References Cited in the file of this patent

UNITED STATES PATENTS 2,664,697    Vuilleumier  ------------- Jan. 5, 1954

FOREIGN PATENTS 807,913    Germany  --------------- July 9, 1951